(12) United States Patent
Koide et al.

(10) Patent No.: US 7,294,302 B2
(45) Date of Patent: Nov. 13, 2007

(54) METHOD FOR CONTROLLING THICKNESS OF SKIN LAYER OF COMPOSITE RESIN MOLDED PRODUCT

(75) Inventors: Atsushi Koide, Nagano-ken (JP); Yoshitoshi Yamagiwa, Nagano-ken (JP); Masashi Suganuma, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 263 days.

(21) Appl. No.: 10/716,190

(22) Filed: Nov. 18, 2003

(65) Prior Publication Data
US 2004/0130066 A1    Jul. 8, 2004

(30) Foreign Application Priority Data
Nov. 19, 2002 (JP) .............................. 2002-335306

(51) Int. Cl.
*B29C 45/13* (2006.01)
*B29C 45/16* (2006.01)
(52) U.S. Cl. ............... 264/255; 264/328.8; 264/328.18
(58) Field of Classification Search ........... 264/328.18; 106/31.95
See application file for complete search history.

(56) References Cited

U.S. PATENT DOCUMENTS

| | | | | |
|---|---|---|---|---|
| 4,174,413 A | * | 11/1979 | Yasuike et al. | 428/35.7 |
| 5,443,378 A | * | 8/1995 | Jaroschek et al. | 425/130 |
| 5,792,397 A | * | 8/1998 | Ritchey | 264/40.7 |
| 6,382,763 B1 | * | 5/2002 | Albuquerque et al. | 347/21 |
| 6,464,908 B1 | * | 10/2002 | Friend et al. | 264/29.2 |
| 2002/0132075 A1 | * | 9/2002 | Friend et al. | 428/35.7 |

FOREIGN PATENT DOCUMENTS

| | | |
|---|---|---|
| JP | 10-202694 | 8/1998 |
| JP | 2000-141405 | 5/2000 |
| JP | 2002-097375 | 4/2002 |
| JP | 2002-105329 | 4/2002 |

OTHER PUBLICATIONS

Jody Erickson, Incorporating Carbon Nanotubes into Polypropylene Fibers, 2003, p. 54.*

* cited by examiner

*Primary Examiner*—Edmund H. Lee
(74) *Attorney, Agent, or Firm*—Weingarten, Schurgin, Gagnebin & Lebovici LLP

(57) ABSTRACT

To control the thickness of the skin layer of a composite resin molded product by a viscosity difference obtained by varying the viscosity by adding another ultra-minute substance to a raw resin material.

The composite resin molded product comprising the skin layer formed of a first thermoplastic resin and the core layer formed of a second thermoplastic resin is molded by injection. The viscosity difference between the resins is controlled by adding a carbon nanomaterial to one or the other of the thermoplastic resins. The thickness of the skin layer is controlled by the viscosity difference. The first thermoplastic resin and the second thermoplastic resin are of the same kind or different kinds of resins.

10 Claims, 2 Drawing Sheets

METHOD FOR CONTROLLING THICKNESS OF SKIN LAYER OF COMPOSITE RESIN MOLDED PRODUCT

This application claims priority to a Japanese patent application No. 2002-335306 filed Nov. 19, 2002.

BACKGROUND OF THE INVENTION

1. Field of the Invention

This invention relates to a method for controlling the thickness of a skin layer of a compositely made thermoplastic resin molded product having a skin layer and a core layer.

2. Detailed Description of the Prior Art

Conventionally, when molding a composite molded product, an inner core is increased in percentage by making the viscosity of the first resin with carbon dioxide gas lower than that of the second resin (refer to the patent literature 1).

Moreover, when positively controlling a molding position of a hollow part by injecting the second molding material differing in viscosity to the first molding material, a fibrous or granular filler is added to the resin so that a suitable difference in viscosity can be obtained (refer to the patent literature 2).

Patent literature 1: The Japanese Patent Publication 1999-202694 (Page 2)

Patent literature 2: The Japanese Patent Publication 2000-141405 (Page 4)

In injection molding, the thermoplastic resin (hereafter called resin) is plasticized and injected into a metallic mold, and is solidified by cooling to mold the molded product. While most of molded products are generally molded of a single kind of resin, while it is known as sandwich molding to manufacture a composite resin molded product by injection molding it of a same or different kinds of resins.

In the case of the sandwich molding, a first resin making the skin layer forming the surface layer part of the molded product is injected into the cavity of a metallic mold in advance, and then a second resin making the core layer is injected into the first resin so as to be filled therein. Thickness of the skin layer formed by the molding depends on the viscosity characteristics of the first and second resins, and the skin layer tends to be formed thinner when the viscosity of the first resin is set lower than that of the second resin.

It is known that the viscosity of resin varies according to plasticizing temperatures and shear rates. However, the thickness of the skin layer is not freely controllable by the variation in the viscosity according to them. In addition, since there is also a fear of causing deterioration in the physical properties of the resins, the viscosity difference made at the time of molding a composite molded product is provided by artificially varying the viscosity by means of adding another material thereto.

According to the above-mentioned patent literature 1, the viscosity difference between the first and second resins is made by dissolving carbon dioxide gas in a molten resin. However, since the method using carbon dioxide gas needs not only a carbon dioxide gas supply facility but also a resin foaming machine and an arrangement for discharging and processing unnecessary used gases, the method has the problem that the arrangement costs have to be high.

Moreover, as described in the patent literature 2, in some of the means for obtaining the viscosity difference, a fibrous filler such as whiskers, metallic fiber, glass, carbon or a granular filler such as talc, calcium carbonate, mica is added to a resin. Although such means do not have the arrangement cost problem as in the case of using carbon dioxide gas, the above-mentioned filler may influence on the physical properties of the resin depending on the addition, and moreover, when the filler is added to the first resin for forming the skin layer, the filler is exposed on the surface of the skin layer, therefore, the means also has a problem that it is hard to be employed depending on molded products.

This invention has been devised in order to solve the conventional problems mentioned above, and the purpose thereof is to provide a new method by which the viscosity is varied by adding an ultrafine foreign substance to a raw material resin, and the thickness of the skin layer of the composite resin molded product is controlled by the viscosity difference arising therein, but which does not have an influence on the physical properties of the resin and the molded product by the addition of the foreign substance.

SUMMARY OF THE INVENTION

This invention for the purpose mentioned above is that the thickness of the skin layer is controlled by the difference in viscosity between the two kinds of resins provided by adding a carbon nanomaterial to either of the thermoplastic resins when manufacturing the composite resin molded product consisting of the skin layer comprising the first thermoplastic resin and the core layer comprising the second thermoplastic resin by injection molding, and that the first thermoplastic resin and the second thermoplastic resin consist of the same kind of resin or different kinds of resins. This invention for the purpose mentioned above is a method for controlling a thickness of a skin layer on a composite product having the skin layer and a core layer, comprising steps of:

(a) adding a carbon nanomaterial to either a first thermoplastic resin or a second thermoplastic resin to cause or increase a difference in viscosity between those resins; and (b) injection molding both said resins into a mold together or separately to produce said composite product having the skin layer containing said first thermoplastic resin and the core layer containing said second thermoplastic resin so as to control the thickness of the skin layer by said difference in viscosity. The first thermoplastic resin and the second thermoplastic resin are composed of the same kind of resin or different kinds of resins.

DETAILED DESCRIPTION OF THE PREFERRED EMBODIMENT

Figure 1:
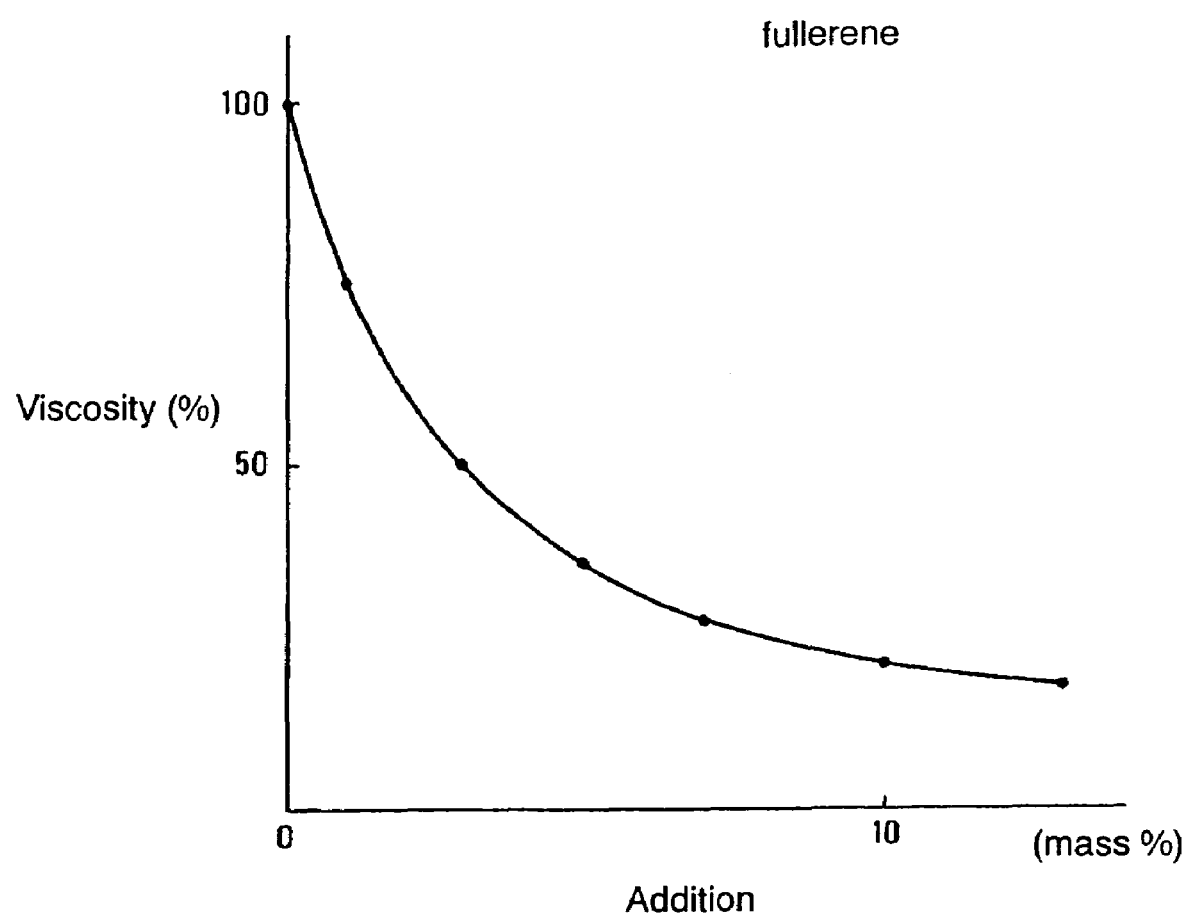
FIG. 1 illustrates a graph of viscosity variation of polypropylene (PP) according to the addition of fullerene.

Although an illustration is omitted, the composite resin molded product to be developed by the present invention is molded by using two in-line screw type injection machines or two preplasticating injection machines similarly to ordinary composite resin molded products. The cavity of the metallic mold is firstly filled with the first resin forming the skin layer from an injection machine either the in-line screw type injection machines or preplasticating injection machines, and next, the first resin in the cavity is filled with the second resin from the other injection machine, which is the same type with the one used at first, and the composite resin molded product is then molded.

The raw material resins for the composite resin molded product are thermoplastic resins used as molding materials for goods, for example, the resins such as polypropylene, olyethylene, polyester, polyamide, polycarbonate, and ABS. Two resins, the same kind or different kinds, of those thermoplastic resins given as the example are plasticized as he first resin making the skin layer or the second resin making the core layer. Next, the plasticized resins are injected and filled to the cavity as described above, the composite resin molded product comprising the skin layer molded by the first resin and the core layer molded by the second resin is then produced.

Even in the same kind of resins, a viscosity difference is caused to some extent depending on a plasticizing temperature and a shear rate, however, with such a degree of the viscosity difference arising there, by injecting the second resin therein, it is difficult to control the thickness of the skin layer made of the first resin to a set thickness. Similarly, in the case of the resins of different kinds, even if the viscosity difference arises from the inherent viscosity of the individual resins, the thickness of the skin layer arising from the viscosity difference is always constant, therefore, the thickness of the skin layer cannot be controlled with the viscosity difference according to composite resin molded products, unless the viscosity of the resins are made to arbitrarily vary by a certain means.

Therefore, either of the first and second resins is provided with a viscosity difference by adding a carbon nanomaterial. As the carbon nanomaterial, carbon nano-fiber of, for example, a 50-200 nm diameter and a 100-1000 aspect ratio, carbon nanotube of, for example, a 1-5 nm diameter and a 100-1000 aspect ratio, and fullerene of, for example, a 0.7-1 nm diameter can be mentioned. Since they are more ultrafine particles than a conventional filler, they are familiar with the resins and have a better dispersion efficiency by kneading, and accordingly, the variation in viscosity can be provided without damaging the physical properties of the raw material resins.

As long as an addition of carbon nanomaterial is in the range of 1 to 20 mass %, plasticization and injection filling of the raw material resins can be performed according to an ordinary method. As the addition is increased within the range, the viscosity variations, however, there is a difference in the viscosity variation between the spherical particles like fullerene and fibrous particles having a length like carbon nanotube.

FIG. 1 shows a relation between viscosity at injection condition of polypropylene resin (PP) added with fullerene and the amounts of added fullerene. The viscosity of PP decreases as the addition increases, and it is presumed that this result is obtained because fullerene does not have directionality due to its spherical shape of the particles and they are easy to be uniformly dispersed by plasticization of the resin.

Figure 2:
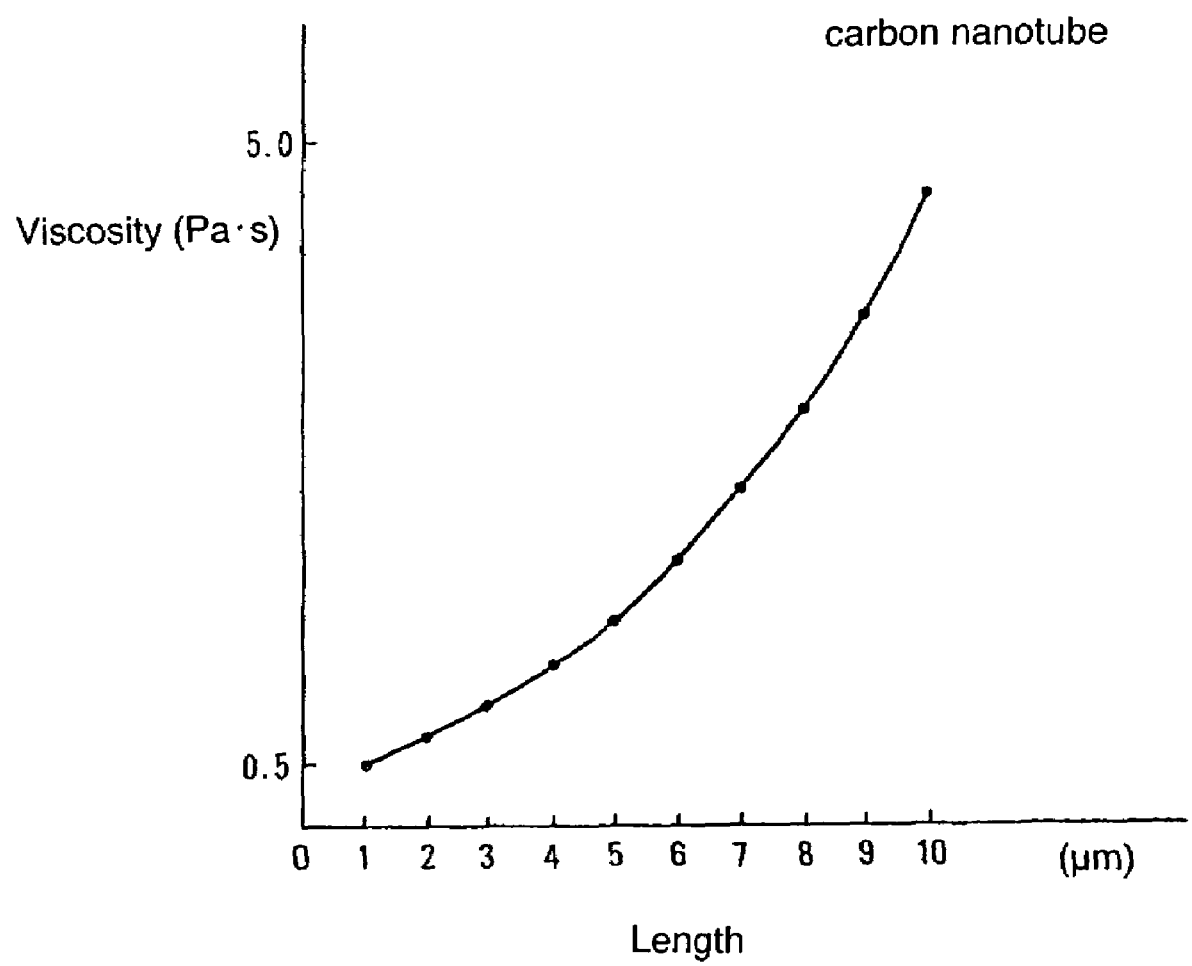
FIG. 2 illustrates a graph of viscosity variation of polypropylene (PP) according to the lengths of carbon nanotube.

FIG. 2 shows a relation between viscosity at injection condition of polypropylene resin (PP) added with same amount of carbon nanotube and the lengths of carbon nanotube. The viscosity decreases as the addition increases, but on the other hand, the viscosity increases as the length of the particle increases. It is presumed that since directionality arises because of lengthy particles and the particles are entangled with each other, they exist together in the random longitudinal directions of the particles even if they are uniformly dispersed in the resin. In other word, with carbon nanotube, the viscosity variation becomes controllable by controlling the length and addition of the particles.

An illustration is omitted here, but in order to mold a molded product by injection, a first injection machine provided with two hoppers for the raw material resin and the carbon nanomaterial and a second injection machine provided with a hopper for the raw material resin are used. Both machines are set so as to touch a common metallic mold with their nozzles and to be able to fill the cavity of the molded product by injection with the thermoplastic resin through the same gate or hot runner.

Next, the same kinds of resins are stored in the resin hoppers on both injection machines as the first resin and the second resin. Moreover, the pre-manufactured composite material of the resin and the carbon nanomaterial, or a master batch is stored in the other hopper on the first injection machine. The first resin and the carbon nanomaterial are supplied to the first injection machine at the same time. In this case, by adjusting the supply amount of both of the first resin and the carbon nanomaterial, a set amount of carbon nanomaterial is mixed with the first resin. On the other hand, the second resin is supplied to the second injection machine.

The carbon nanomaterial and the first resin supplied to the first injection machine are plasticized by heating with a band heater around the injection machine and rotation of the screw installed inside and are completely kneaded. At the same time, the second resin is also plasticized with the second injection machine. After the plasticization has been completed, the first and second resins are injected into the cavity for filling from both of the injection machines. In these injection fillings, the first resin from the first injection machine precedes. The timing of the injection by the second injection machine may be either after the injection filling has been completed by the first injection machine or during the injection before completed. The second resin is injected in the first resin in any case, and the composite molded product formed of the skin layer made of the first resin and the core layer made of the second resin is completed when the injection filling of the second resin has been completed. The first resin, which is decreased in viscosity by adding the carbon nanomaterial thereto, is pressed and stretched by the resin pressure of the second resin, so that the thickness of the skin layer is formed thinner or thicker. Therefore, the thickness of the skin layer is to be controlled according to the additions of the carbon nanomaterial.

The above are the explanation about the case that the thickness of the skin layer is controlled by lowering the viscosity of the first resin by adding the carbon nanomaterial thereto to provide a viscosity difference across the second resin of the same kind, however, it is also possible to control the thickness of the skin layer by lowering the viscosity of the second resin by the similar means.

As described above, according to the present invention in which either of the first or second resins is varied in viscosity by adding the carbon nanomaterial, the problem of the arrangement costs in the case of the conventional method by adding carbon dioxide gas is solved and lowering the viscosity of the resins can also be performed efficiently. Moreover, since the carbon nanomaterial is far finer than the filler such as carbon fiber beyond comparison, the resin is neither deteriorated in physical properties, nor lowered in strength of the molded product even in addition amounting to about 20 mass %, and the thickness of the skin layer can properly be controlled by adjusting the addition.

EMBODIMENT

| | |
|---|---|
| Injection Molding machine: | FN1000-12AD (manufactured by NISSEI PLASTIC INDUSTRIAL CO., LTD.) |
| Raw material resin: | Polypropylene (PP) |
| Carbon nanomaterial: | 10 nm diameter, 1-10 µm length, tube-like form |
| Addition: | 10 mass % (added to the second resin) |
| Resin viscosity: | The first resin 20 Pa · s, The second resin 15 Pa · s |
| Molding conditions: | Plasticizing temperature 200° C. Injection speed 100 mm/s Injection pressure 100 Mpa |
| Molded product (plate): | Plane area 36.0 cm$^2$, Thickness 2.0 mm Skin layer 0.24 mm, Core layer 1.52 mm |

What is claimed is:

1. A method for controlling a thickness of a skin layer on a composite product having the skin layer and a core layer, comprising steps of:
   (a) adding a carbon nanomaterial to at least one of a first thermoplastic resin and a second thermoplastic resin, to cause or increase a difference in viscosity between those resins;
   (b) injection molding the first thermoplastic resin into a mold through a gate or hot runner using a first injection machine; and
   (c) injection molding the second thermoplastic resin into the mold through said gate or hot runner using a second injection machine,
   wherein said second thermoplastic resin is injected into said first thermoplastic resin so that the skin layer of said composite product contains said first thermoplastic resin and the core layer contains said second thermoplastic resin, and
   wherein the thickness of the skin layer is controlled by said difference in viscosity.

2. The method according to claim 1, wherein said first resin and said second resin are same kind of resin.

3. The method according to claim 1, wherein said first resin and said second resin are different kinds of resins.

4. The method according to claim 1, wherein adding the carbon nanomaterial to the first thermoplastic resin or to the second thermoplastic resin includes kneading said carbon nanomaterial and thermoplastic resin to provide better dispersion efficiency.

5. The method according to claim 1, wherein adding the carbon nanomaterial to the thermoplastic resins comprises adding the carbon nanomaterial in a range between about 1 and about 20 percent by mass.

6. The method according to claim 1, wherein adding the carbon nanomaterial comprises adding fullerene to a polypropylene resin to decrease the viscosity of the polypropylene resin.

7. The method according to claim 1, wherein the carbon nanomaterial is a carbon nanotube and the carbon nanotube has a particle length and a viscosity variation is controlled by controlling the particle length of the carbon nanotube.

8. The method according to claim 7, wherein the viscosity increases with increasing particle length of the carbon nanotube.

9. The method according to claim 1, wherein carbon nanomaterial is added to the second thermoplastic resin so that the viscosity of the second thermoplastic resin is made greater than the viscosity of the first thermoplastic resin and the skin layer of the first thermoplastic resin is pressed and stretched by the more viscous second thermoplastic resin layer to control its thickness.

10. The method according to claim 1, wherein carbon nanomaterial is added to the first thermoplastic resin so that the viscosity of the first thermoplastic resin is made less than the viscosity of the second thermoplastic resin and the skin layer of the first thermoplastic resin is pressed and stretched by the more viscous second thermoplastic resin layer to control its thickness.

* * * * *